United States Patent Office 3,824,266
Patented July 16, 1974

3,824,266
POLYISOCYANATES WHICH CONTAIN BIURET GROUPS
Werner Dietrich, Cologne, Kuno Wagner, Karl Hartwig Richert, and Helmut Kleimann, Leverkusen, and Christian König, Dormagen, Germany, and Walter Meckel, New Martinsville, W. Va., assignors to Bayer Aktiengesellschaft, Leverkusen, Germany
No Drawing. Continuation-in-part of abandoned application Ser. No. 98,121, Dec. 14, 1970. This application Feb. 5, 1973, Ser. No. 329,919
Claims priority, application Germany, Dec. 17, 1969, P 19 63 190.4
Int. Cl. C07c 119/04
U.S. Cl. 260—453 AB     5 Claims

ABSTRACT OF THE DISCLOSURE

Polyisocyanates which contain biuret groups are prepared by a process which comprises reacting a polyisocyanate with a diprimary aromatic diamine the reactivity of which amines with isocyanates are attenuated by electrophilic substituents or substituents which sterically hinder the amino groups such that intimate mixing of the reactants is possible with no immediate reaction such as, for example, the formation of polyureas taking place.

---

This application is a continuation-in-part of application Ser. No. 98,121, filed Dec. 14, 1970, now abandoned, and relates to a process for the preparation of polyisocyanates which contain biuret groups and to the use of these polyisocyanates in the production of polyurethane resins and in particular polyurethane foam resins.

It is well known that polyisocyanates which have a biuret structure can be obtained by the reaction of water with polyisocyanates. It is also known that polyisocyanates which have a biuret structure can be obtained by reacting a monoamine with a diisocyanate with concomitant elimination of the monoisocyanate corresponding to the monoamine. These processes all have the disadvantage in that by-products are also formed which are quite difficult to remove.

In British Patent Specification 1,078,390, the biuret is formed directly from diamines and polyisocyanates by carrying out the reaction in a solvent with a boiling point below the boiling point of the isocyanate. The disadvantage of this process is that the solvent must be removed by distillation after the reaction. Direct reaction of the diamines with the isocyanates cannot be carried out in the absence of a solvent because the sparingly soluble polyureas which are immediately formed prevent further reaction with the isocyanate.

It is therefore an object of this invention to provide a process for preparing biuret polyisocyanates devoid of the foregoing disadvantages. It is a further object of this invention to provide a process for preparing biuret polyisocyanates which dispenses with the need for a solvent. Another object of this invention is to provide soluble biuret polyisocyanate compounds. It is an additional object of this invention to provide biuret-containing polyisocyanates in the form of solutions in the biuret-free polyisocyanate starting material. Still another object of this invention is to provide polyurethane foams and resins using as an isocyanate component, the biuret containing polyisocyanate prepared by the process of the invention.

The foregoing objects and others which will become apparent from the following description are accomplished in accordance with the invention, generally speaking, by directly reacting a polyamine which contains primary amino groups with a polyisocyanate in the absence of a solvent by attenuating the nucleophilic character of the primary amino groups of the polyamine. Thus the reactivity of the amines with the isocyanates must be lessened to such a degree that a homogeneous mixture of amine and isocyanate is obtained either before the reaction between the two components begin or the reactivity lessened to such a degree that the reaction between the amine and isocyanate is arrested at a low molecular weight stage so that only soluble products are obtained.

In order to achieve the requisite degree of attenuation, the reactivity with polyisocyanates of the diprimary aromatic diamines is reduced by electrophilic substituents in ortho and/or para position relative to the amino group or by substituents in ortho position which sterically hinder the amino groups such that the reactants can be intimately mixed without the formation of sparingly soluble polyureas. Suitable electrophilic substituents are e.g. —COOR ($R=C_1$–$C_6$-alkyl, $C_5$–$C_8$-cycloalkyl or $C_6$–$C_{10}$-aryl), —COR (R as defined for —COOR), —CHO, —$NO_2$, —C≡N, —$SO_2R$ (R as defined for —COOR). Suitable substituents which sterically hinder the amino group are all substituents in ortho position other than hydrogen. Preferred substituents are e.g., $C_1$–$C_6$-alkyl, F, Cl, Br, I, —O—R (R as defined for —COOR), $C_5$–$C_7$-cyclo alkyl, $C_6$ to $C_{10}$-aryl, etc. The reaction is carried out at a temperature of from about 100° C. to about 200° C. The reactants being present in such proportion such that the $NH_2$:NCO ratio is from 1:2 to 1:100.

The procedure which is most suitable is that of adding the polyamine incrementally, and preferably, dropwise to the polyisocyanate with stirring at the reaction temperature. The amine immediately goes into solution and forms the biuret structure in quantitative yields via the formation of urea compounds which are not isolated. The process is relatively easy to control and may easily be adapted to prepare biuret isocyanates on a continuous basis.

The reaction is advantageously carried out in a three-necked flask which is equipped with a stirrer, a dropping funnel and a thermometer. The polyamine is added dropwise to the polyisocyanate at a temperature of from about 100° C. to about 200° C., preferably from about 130° C. to about 170° C., at such a rate that the temperature rises by not more than 30° C. The proportion of reactants is so chosen that the $NH_2$ to NCO ratio is 1:2 to 1:100, preferably 1:4 to 1:40. Solid amines may also be added in a finely powdered form. In this procedure, the biuret is in most cases obtained directly without the intermediate urea stage. The reaction comes to a standstill at the biuret stage more or less regardless of the $NH_2$ to NCO ratio employed, with the result that, for example, in the reaction between a diprimary aromatic diamine and an aliphatic or aromatic diisocyanate, a tetraisocyanate of the general formula.

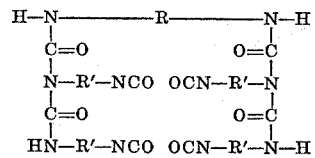

is obtained in which

R is the arylene radical corresponding to the diamine, and

R′ is the arylene or alkylene radical of the diisocyanate.

In some cases, it is advisable to adjust the NCO content to the theoretically calculated value by afterheating to from about 160° C. to about 175° C. If desired, the functionality of the isocyanate may be further increased by prolonged heating at a temperature of up to about 170° C.

A most preferred embodiment consists of supplying polyamines and polyisocyanates from separate containers to a heatable reaction tube after they have been intimately mixed in front of the tube. After a short residence time in the reaction tube, the isocyanate-biuret mixture leaves the tube. This process can be conducted adiabatically.

The amines contemplated for use in the process according to the invention are aromatic diprimary diamines the reactivity of which towards isocyanate groups has been reduced to such an extent by electrophilic substituents in ortho- and para-position to the amino-group or by substituents in ortho-position which sterically hinder the amino groups that intimate mixing of the reactants at the start of the reaction is possible. Some diamines which are so attenuated in their reactivity with polyisocyanates are, for example, 3,5-diamino-4-chloro-benzoic acid ester,
2,4-diamino-3,5-diethyltoluene,
ethylene glycol-4,4'-diaminodiphenyl ether,
4-amino-3-chlorophenyl ester of 4-chloro-3-aminobenzoic acid,
4,4'-diamino-3,3'-dichlorodiphenyl ester of succinic acid,
2,4-diaminochlorobenzene,
1,5-dichloro-2,4-diaminobenzene,
2,5-dichloro-1,4-diaminobenzene,
2,6-dichloro-1,4-diamino-benzene,
3,5-diaminobenzoic acid esters,
5-nitro-2,4-diaminotoluene,
6,6'-dinitro-4,4'-diamino-3,3'-dimethyldiphenyl,
3,3'-dichloro-4,4'-diaminodiphenyl, and
3,3'-dichloro-4,4'-diaminodiphenylmethane and the like.

The polyisocyanates preferably used are diisocyanates such as, for example, tetramethylenediisocyanate, hexamethylenediisocyanate, m-xylylene-diisocyanate, p-xylylenediisocyanate, 1,3-xylylenediisocyanate, cyclohexane-1,4-diisocyanate, dicyclohexylmethane-4,4'-diisocyanate, m-phenyl diisocyanate, p-phenylenediisocyanate, tolylene-2,4- and 2,6-diisocyanate and isomeric mixtures thereof, 1-benzylbenzene-2,6-diisocyanate,
2,6-diethylbenzene-1,4-diisocyanate,
diphenylmethane-4,4'-diisocyanate,
3,3'-dimethoxydiphenylmethane-4,4'-diisocyanate, and
naphthylene-1,5-diisocyanate and the like. Trifunctional and higher functional polyisocyanates may also be used, such as, for example, toluene-2,4,6-triisocyanate or polymethylene-polyphenyl-polyisocyanate obtained by aniline-formaldehyde condensation followed by phosgenation. Isocyanates which contain carbodiimide, uretoneimine or isocyanurate groups may also be used, as may also mixtures of the above mentioned isocyanates. In addition, reaction products of polyhydric alcohols with polyvalent isocyanates or polyisocyanates of the type mentioned for example, in German Patent Specifications 1,022,789 and 1,027,394 may also be used.

The biuret-containing polyisocyanates obtained by the process of the invention are generally obtained in the form of solutions in the biuret-free polyisocyanates used as the starting material. Such solutions are eminently suitable for use as starting components for the production of polyurethane resins, especially polyurethane foam resins. The present invention thus also relates to the use of the biuret-containing polyisocyanates prepared by the process described above as isocyanate components for the production of polyurethane resins and in particular polyurethane foam resins by the well-known isocyanate polyaddition process.

The solutions of the biuret-containing polyisocyanates in biuret-free polyisocyanates prepared by the process described above are used preferentially for the production of hard, semi-hard and soft polyurethane foam resins. They may be used especially advantageously in the known foaming-in-the-mold process.

This latter process is characterized in that the reaction of polyols, polyisocyanates and additives takes place in closed molds the capacity of which is, for example, about $\frac{1}{10}$ to about $\frac{9}{10}$ of the volume which the foam would occupy if expanded in an open mold, and the temperature of the inner surface of the mold is at least about 20° C. below the maximum temperature occurring within the reaction mass during the reaction.

This process is based on the finding that the distribution of density over the cross-section of foam products, produced by foaming the mixtures described above in closed molds with restricted room for expansion, is a function of the temperature gradient which becomes established in the course of the reaction between the surface of the material which is being molded and its core. This temperature gradient is calculated from the maximum temperature in the interior of the material foamed up in the mold and the given temperature of the inner surface of the mold.

The maintainance of a temperature gradient between the surfaces and core of the foamed material, which is a characteristic feature of the process, obtains the result that the finished foam products have comparatively solid surfaces and that their density decreases from the surfaces to the centre. The greater the difference between the surfaces and the core the greater is this decrease in density, and certain properties, such as the heat resistance, rigidity and flexural strength are thereby considerably improved as compared with similar foam products which have a uniform density.

Efficient removal of heat from the surfaces must be insured since considerable quantities of heat are liberated in the course of the polyaddition. The molds used are therefore advantageously made of a material of high thermal conductivity, preferably a metal, although molds made of other materials may also be used, such as, for example, molds made of synthetic resins (epoxide and polyester materials) or, if desired, laminated wood, glass or concrete. The temperature of the mold is generally maintained between about 20° C. and about 120° C., preferably between about 40° C. and about 80° C.

The ratio of the volume available for expansion of the foam in the closed mold to that which would be taken up by the foam when expanded in an open mold should be at least about 9:10 and preferably from about 8:10 to about 1:10 which corresponds to a compression factor $(Vo/V)$ of at least 1.1 and preferably from about 1.25 to about 10.

Any of the compounds containing active hydrogen atoms conventionally used in polyurethane chemistry, i.e., polyhydroxyl compounds, may be used for the production of polyurethane resins, especially polyurethane foam resins, using, according to the invention, the biuret-containing polyisocyanates as isocyanate components. In addition, any of the usual additives used in polyurethane chemistry, such as activators, emulsifiers, blowing agents, fire retarding substances, and the like may be included.

Suitable polyhydroxyl compounds include those having molecular weights of up to 3500, such as, for example, low molecular weight polyhydric alcohols, and polyesters, polyethers, polythioethers, polyacetals, polycarbonates and polyester amides which contain several hydroxyl groups, and which are known per se for the production both of homogeneous and of cellular polyurethanes.

The hydroxypolyesters used may, for example, be reaction products of polyhydric alcohols with polybasic carboxylic acids as used in all the variations in polyurethane chemistry. Instead of the free carboxylic acids, however, the corresponding polycarboxylic acid anhydrides, polycarboxylic acid esters or mixtures of these compounds may be used for preparing the hydroxypolyesters. The polycarboxylic acids may be aliphatic, cycloaliphatic, aromatic and heterocyclic compounds which may be substituted and/or unsaturated. The following are mentioned as specific examples of such compounds: succinic acid, adipic acid, sebacic acid, phthalic acid, isophthalic acid, phthalic acid anhydride, maleic acid, maleic acid anhydride, monomeric, dimeric and trimeric fatty acids, dimethylterephthalate, and the like. The polyol components may include, for example, ethylene glycol, propylene glycol-(1,3), butylene glycol-(1,4), butylene glycol-(2,3), glycerol, trimethylol ethane, pentaerythritol, mannitol and sorbitol, methyl glycoside, polyethylene glycols, polypropylene glycols, polybutylene glycols and the like. Polyesters having terminal carboxyl groups are also suitable for the reaction according to the invention with the biuret polyisocyanates.

Suitable hydroxypolyethers include those of the conventional type and are prepared for example by polymerization of epoxides such as ethylene oxide, propylene oxide, butylene oxide, styrene oxide or epichlorohydrin, optionally with starting components which have reactive hydrogen atoms, such as alcohols or amines, such as glycerol, trimethylolpropane, ethylene glycol, ammonia, ethanolamine, or ethylene diamine. Sucrose polyethers may also be used according to the invention.

Other polyhydroxyl compounds which may be used as reactants for the biuret polyisocyanates to be used according to the invention are described for example in Saunders-Frisch, "Polyurethanes, Chemistry and Technology," Volumes I and II, Interscience Publishers, 1962 and 1964 (pages 32 et seq., Volume I and pages 5 and 198 et seq., Volume II) and in Kunststoff-Handbuch, Volume VII, Vieweg-Hochtlen, publishers Carl-Hanser-Verlag, Munich, 1966, e.g., on pages 45 to 71. Epoxy resins, hydrogenation products of copolymers of ethylene, olefine and carbon monoxide, phenol formaldehyde resins which have been reacted with alkylene oxides, and urea formaldehyde resins may also be used. In addition, low molecular weight polyhydroxyl compounds of the type already mentioned above and/or chain lengthening agents such as glycols, diamines or water, aldimines and ketimines may be used either alone or added to the other reactants.

Numerous suitable flame retarding substances are known in the art and generally contain phosphorus and halogens. Compounds of antimony, bismuth or boron are also suitable. A survey of the conventional and advantageous flame retarding agents is given in the chapter "Flammhemmende Substanzen," pages 110 to 111 in Kunststoff-Handbuch, Volume 7, Polyurethane by Vieweg-Hochtlen, Carl-Hanser-Verlag, Munich, 1966. The flame retarding agents are generally added in amounts of from 1 to 20% by weight, preferably from 1 to 15% by weight, based on the quantity of the polyisocyanate combinations used.

The blowing agents used may be alkanes, haloalkanes or low boiling solvents in general, such as, for example, methylene chloride, monofluorotrichloromethane, difluorodichloromethane, acetone, methylformide, and the like. The blowing agents used may also be compounds which liberate gases at elevated temperatures, such as azo compounds or diurethane of bis-semiacetals obtained from 2 mols of formaldehyde and 1 mol of ethylene glycol.

Suitable activators include tertiary amines such as triethylamine, dimethylbenzylamine, tetramethylethylene diamine, N-alkylmorpholines, endoethylenepiperazine, urotropine, hexahydrotriazines such as trimethylhexahydrotriazine, 2,4,6 - dimethylaminomethyl phenol or organic metal salts such as stannous acrylates, such as, for example, stannous salts of 2-ethylcaproic acid, dialkylstannic acrylates such as dibutyl stannic dilaurate or acetyl acetonates of heavy metals such as iron.

Suitable emulsifiers include, hydroxyethylated phenols, higher sulphonic acids, sulphonated castor oil, hydroxyethylated castor oil, sulphonated ricinoleic acid and ammonium salts of oleic acid. As examples of suitable foam stabilizers there may be mentioned those based on polysiloxane-polyalkylene glycol copolymers or basic silicone oils. Other suitable emulsifiers, catalysts and additives are mentioned in "Polyurethanes, Chemistry and Technology," Volumes I and II, Saunders-Frisch, Interscience Publishers, 1962 and 1964.

The quantity of the polyisocyanate solutions containing biuret polyisocyanate is generally so chosen that the number of isocyanate groups present is equivalent to the sum of the reaction hydrogen atoms, but in particular cases an excess or subequivalent amount of isocyanate may be used. If water is used as a blowing agent for the production of foam resins then the polyisocyanate is used in an excess corresponding to the amount of water. Certain amounts of isocyanates may be built into the foam resin in the form of isocyanurate groups, uretdione groups and/or carbodiimide groups in the course of the foaming process by the addition of trivalent or pentavalent phosphorus compounds such as phospholidines, phospholine oxide, tertiary esters, amides or ester amides of phosphorous or phosphoric acid.

The foam production itself is carried out by conventional methods at room temperature or at an elevated temperature by simply mixing the polyisocyanate combinations with the compounds which carry hydroxyl and/or carboxyl groups, optionally using water, accelerators, emulsifiers and other auxiliary substances such as flame retarding substances and blowing agents. Mechanical devices are advantageously used for this purpose, such as, for example, those described in French Patent Specification 1,074,713.

The foam resins obtained are widely used in the building industry as building panels, sandwich elements, ceilings, parapet boards, for thermal insulation in refrigeration furniture, cold storage houses, refrigeration cars and cold storage containers as well as in road and rail construction, for the technical insulation of pipes, for insulating fuel depots and in ship building, and air filters and filters for hydrocarbons in combustion engines, and as shockproof packing material. The foam products may be hard, semi-hard or soft so that they may also be used as cushion material. Using biuret polyisocyanates, semi-hard polyurethane resins having a compact surface and cellular core may be produced by foaming in the mold, surprisingly smooth, homogeneous and heat-resistant marginal zones being obtained as well as cellular cores. Foams of this type are suitable for motor vehicle fittings and similar uses.

The invention is further illustrated but is not intended that it be limited by the following examples in which all parts are by weight unless otherwise specified.

EXAMPLES

Example 1

(a) About 243 parts of 3,5-diamino-4-chloro-benzoic acid propyl ester are reacted with about 2086 parts of tolylene-2,4-diisocyanate at about 130° C. The diamine is added to the diisocyanate over a period of about 30 minutes such that the temperature does not rise above about 160° C. A polyisocyanate containing about 36.0% by weight of NCO and having a viscosity of about 297 cp. (25° C.) is obtained after cooling.

(b) About 100 parts of the polyisocyanate described in Example 1(a) are intimately mixed with about 100 parts of a polypropylene glycol polyether of OH number 470 which was started on sorbitol, about 0.6 parts of endoethylene piperazine, about 1 part of silicone stabilizer (Sf 1109 of General Electric) and about 40 parts of monofluorotrichloromethane. A hard polyurethane foam having the following physical characteristics is obtained.

Bulk density: 25 kg./m.$^3$
Compression strength: 2.5 kg. wt./cm.$^2$
Resistance to bending in the heat: 130° C.
The foam is dimensionally stable at −30 to +100° C.

(c) About 100.0 parts of a polypropylene polyether which was started on trimethylolpropane/hexane triol and modified with ethylene oxide so that it had approximately 60% of primary hydroxyl end groups with an OH number of 35.0, about 3.0 parts of water, about 0.2 parts of endoethylene piperazine, about 1.0 parts of triethylamine and about 1.0 parts of triethanolamine are mixed together and reacted with about 42.0 parts of a polyisocyanate prepared according to Example 1(a) from about 193 parts of 3,5-diamino-4-chloro-benzoic acid isopropylester and about 2086 parts of an isomeric mixture of about 80 parts of 2,4- and about 20 parts of 2,6-diisocyanato toluene (NCO content 38.4%, viscosity 62 cp. at 25° C.). A foam which has the following mechanical properties is obtained.

Bulk density according to DIN 53,420: 40 kg./m.$^3$
Tensile strength according to DIN 53,571: 0.7 kg. wt./cm.$^2$
Elongation at break according to DIN 53,571: 120%
Compression strength at 40% compression according to DIN 53,577: 25 p./cm.$^2$ (d) About 40 parts of an addition product of propylene oxide and trimethylolpropane (OH number 650), about 20 parts of an addition product of propylene oxide and triisopropanolamine (OH number 290), about 40 parts of an addition product of propylene oxide and trimethylolpropane, which addition product was modified with ethylene oxide to result in about 60% of primary OH groups (OH number 28), about 1 part silicone stabilizer (OS 20 of Goldschmidt AG), about 2 parts of N-methylol - N' - (N,N-dimethylaminoethyl) piperazine and about 8 parts of monofluorotrichloromethane are mixed together and the mixture is thoroughly stirred together for about 10 seconds with about 102 parts of a polyisocyanate prepared according to Example 1(a) from about 272 parts of 3,5-diamino-5-chloro-benzoic acid isopropyl ester and about 2086 parts of tolylene-2,4-diisocyanate (viscosity $\eta_{25}$=1818 cp., NCO=34.4%). The mixture is introduced into a metal mold heated to about 60° C' (300 x 300 x 10 mm.). The reaction starts after about 20 seconds with foaming of the reaction mass. The reaction product gels after about a further 12 seconds. The molded product is removed from the mold after about 5 minutes. It has an overall bulk density of about 0.66 g./cm.$^3$ and a compact marginal zone on both sides.

Mechanical properties of the synthetic resin produced:
Flexural strength according to DIN 53,423: $\delta_{bB}$=300 kg. wt./cm.$^2$
Elastic modulus from bending test: $E_b$=6500 kg. wt./cm.$^2$
Practical dimensional stability in the heat under bending stress according to:
DIN 53,424, bending stress approximately 3 kg. wt./cm.$^2$
When the amount of sagging is 10 mm. $HB_{10}$=80° C.

Example 2

(a) About 243 parts of the isopropyl ester of 3,5-diamino-4-chloro-benzoic acid are reacted with about 2520 parts of diphenylmethane-4,4'-diisocyanate at about 130° C. The diamine is added dropwise to the diisocyanate over about 35 minutes at about 150° C. to about 160° C. A polyisocyanate containing 24.5% of NCO and having a viscosity of 5886 cp. (at 25° C.) is obtained. In contrast to diphenylmethane-4,4'-diisocyanate, which readily crystallizes, the product remains liquid at room temperature even when left to stand for a considerable time.

(b) About 147 parts of the polyisocyanate described in Example 2(a) are intimately mixed with about 100 parts of a polypropylene polyether of OH number 470 which was started on sorbitol, about 1.2 parts of endoethylene piperazine, about 1 part of silicone stabilizer (Sf 1109 of General Electric) and about 40 parts of monofluorotrichloromethane. A hard polyurethane foam having the following physical properties is obtained.

Bulk density: 36 kg./m.$^3$
Compression strength: 3.4 kg. wt./cm.$^2$
Heat bending resistance: 125° C.

Example 3

About 156 parts of 2,4-diamino chlorobenzene are reacted with about 2700 parts of 2,4'-/2,6-tolylene diisocyanate (80:20) at about 130° C. The diamine is added to the polyisocyanate as described in Example 1. A polyisocyanate having an NCO content of about 39.1% by weight and a viscosity of 62 cp. (at 25° C.) is obtained.

Example 4

(a) About 270 parts of 3,3'-dichloro-4,4'-diamino-diphenyl-methane are reacted with about 2850 parts of 2,4-/2,6-tolylene diisocyanate (80:20) as described in Example 1. A liquid polyisocyanate mixture having a viscosity of 52 cp. (at 25° C.) and an NCO content of about 38.55% by weight is obtained.

(b) About 100.0 parts of a polypropylene polyether which was started on trimethylpropane and modified with ethylene oxide to result in approximately 60% of primary hydroxyl group of OH number 35.0, about 2.5 parts of water, about 0.2 parts of endoethylene piperazine, about 1.5 parts of dimethylbenzylamine, and about 1.0 parts of an oleic acid polyglycol ester of molecular weight about 2000 are mixed together and reacted with about 39.0 parts of the polyisocyanate described in Example 4(a).

A foam which has the following mechanical properties and which is self-extinguishing in the flame test according to ASTM D1692–67T is obtained.

Bulk density according to DIN 53,420: 46 kg./cm.$^3$
Tensile strength according to DIN 53,571: 0.5 kg. wt./cm.$^2$
Elongation at break according to DIN 53,571: 120%
Compression test at 40% compression according to DIN 53,577: 30 p./cm.$^2$ (c) About 93 parts of the polyisocyanate described in Example 4(a) are intimately mixed with about 100 parts of a propylene oxide polyether of OH number 470 which was started on sorbitol, about 0.5 parts of endoethylene piperazine, about 1 part of silicone stabilizer (Sf 1109 of General Electric) and about 40 parts of monofluorotrichloromethane. A hard polyurethane foam which has the following physical properties is obtained.

Bulk density: 25 kg./cm.$^3$
Compression strength: 2.2 kg. wt./cm.$^2$
Heat bending resistance: 120° C.
The foam is dimensionally stable at −30° C. and at +100° C.

Example 5

(a) About 75 parts of 3,3'-dichloro-4,4'-diamino-diphenyl-methane are reacted as described in Example 2 with about 1500 parts of a mixture of about 40 parts of 2,4'- and about 60 parts of 4,4'-diisocyanato diphenylmethane. A liquid polyisocyanate having a viscosity of 132 cp. (at 25° C.) and an isocyanate content of about 29.1% is obtained.

(b) About 100.0 parts of a polypropylene glycol which was started on glycerol and modified with ethylene oxide to result in approximately 60% of primary hydroxyl end groups of OH number 35, about 2.5 parts of water, about 0.2 parts of endoethylene piperazine, about 0.8 parts of triethylamine, and about 1.0 parts of oleic acid polyglycol ester of molecular weight about 2000 are intimately mixed together and reacted with about 49.8 parts of the polyisocyanate prepared as in Example 5(a). A foam resin which has the following mechanical properties and which is to be classified as self-extinguishing in the flame test according to ASTM D1692 is obtained.

Bulk density according to DIN 53,420: 47 kg./cm.$^3$
Tensile strength according to DIN 53,571: 0.9 kg. wt./cm.$^2$
Elongation at break according to DIN 53,571: 130%
Compression test at 40% compression according to DIN 53,577: 31 p./cm.$^2$

Example 6

About 190 parts of ethylene glycol-4,4'-diamino-bisphenylether are reacted according to Example 1(a) with about 3000 parts of tolylene-2,4-diisocyanate. The isocyanate mixture has an NCO content of 41.25%. The viscosity is 14 cp. (25° C.).

Example 7

(a) About 296 parts of 4-amino-3-chlorophenyl ester of 4-chloro-3-amino-benzoic acid are reacted as described in Example 1 with about 2704 parts of tolylene-2,4-diisocyanate. A polyisocyanate mixture which contains 33.4% of NCO and has a viscosity of 11,445 cp. (25° C.) is obtained.

(b) About 118 parts of the polyisocyanate described in Example 7(a) are intimately mixed with about 100 parts of a propylene oxide polyether of OH number 470 which was started on sorbitol, about 0.6 parts of endoethylene piperazine, about 1 part of silicone stabilizer (Sf 1109 of General Electric) and about 40 parts of monofluorotrichloromethane. A hard polyurethane foam which has the following physical properties is obtained.

Bulk density: 29 kg./m.$^3$
Compression strength: 3.3 kg. wt./cm.$^2$
Heat bending resistance: 145° C.
The foam resin is dimensionally stable at −30° C. and +100° C.

Example 8

(a) About 245 parts of 4,4'-diamino-3,3'-dichloro-diphenylsuccinate are reacted as described in Example 1(a) with about 2200 parts of tolylene-2,4-diisocyanate. A polyisocyanate mixture which has a viscosity of 45 cp. (at 25° C.) and an NCO content of 38.85% is obtained.

(b) About 93 parts of the polyisocyanate described under Example 8(a) are intimately mixed with about 100 parts of a propylene oxide polyether of OH number 470 which was started on sorbitol, about 0.5 parts of endoethylene-piperazine, about 1 part of silicone stabilizer (Sf 1109 of General Electric) and about 40 parts of monofluorotrichloromethane. A hard polyurethane foam which has the following physical properties is obtained.

Bulk density: 25 kg./m.$^3$
Compression strength: 1.9 kg. wt./cm.$^2$
Heat bending resistance: 120° C.
The foam is dimensionally stable at −30° C. and +100° C.

Example 9

(a) About 175 parts of 1,5-dichloro-2,4-diaminobenzene are reacted as described in Example 1(a) with about 2200 parts of tolylene-2,4-diisocyanate. A polyisocyanate mixture which has a viscosity of 55 cp. (25° C.) and an NCO content of 39.75% is obtained.

(b) About 91 parts of the polyisocyanate described under Example 9(a) are intimately mixed with about 100 parts of a propylene oxide polyether of OH number 470 which was started on sorbitol, about 0.5 parts of endoethylene piperazine, about 1 part of silicone stabilizer (Sf 1109 of General Electric) and about 40 parts of monofluorotrichloromethane. A hard polyurethane foam which has the following physical properties is obtained.

Bulk density: 25 kg./m.$^3$
Compression strength: 2.3 kg. wt./cm.$^2$
Heat bending resistance: 135° C.
The foams are dimensionally stable at −30° C. and +100° C.

Example 10

(a) About 2436 parts of a mixture of 2,4- and 2,6-tolylene diisocyanate (80:20) are preheated to about 150° C. in a round bottomed flask with constant stirring. About 178 parts of 2,4 - diamino-3,5-diethyltoluene are then added dropwise over a period of about 15 minutes. The reaction mixture is afterheated at about 175° C. for about 3 hours. Undissolved constituents remain in the mixture. The NCO content of the filtrate is 38.5% and the viscosity at 25° C. is 75 cp.

Example 11

(a) About 1000 parts of hexamethylene-1,6-diisocyanate are preheated to about 120° C., and about 141.5 parts of 2,4-diamino-3,5-diethyltoluene are then added dropwise with constant stirring. A slight rise in temperature is observed. When all the reactant has been added, the reaction mixture is heated at about 170° C. for about 2 hours. The NCO content of the mixture after cooling is 32.35%, the viscosity at 25° C. is 112 cp.

(b) About 50.0 parts of a polypropylene glycol which was started on trimethylolpropane and modified with ethylene oxide to result in approximately 60% of primary hydroxyl end groups of OH number 35.0, about 50.0 parts of a polypropylene glycol which was started on propylene glycol and modified with ethylene oxide to result in approximately 65% of primary hydroxyl end groups of OH number 28.0, about 8.0 parts of ethylene glycol, about 15.0 parts of monofluorotrichloromethane, about 1.5 parts of tin dioctoate, about 2.0 parts of bis-dimethylaminethyl ether, about 0.5 parts of endoethylene piperazine, and about 0.5 parts of diethylene glycol are intimately mixed together and reacted with about 47.5 parts of the polyisocyanate described in Example 11(a).

A light fast foam resin which has the following mechanical properties is obtained.

Bulk density according to DIN 53,420: 90 kg./m.$^3$
Tensile strength according to DIN 53,571: 0.5 kg.wt./cm.$^2$
Elongation at break according to DIN 53,571: 60%
Compression test at 40% compression according to DIN 53,577: 25 p./cm.$^2$ (c) About 100 parts of a polyisocyanate prepared according to Example 11(a) from about 192 parts of 2,4-diamino-3,5-diethyltoluene and about 100 parts of hexamethylene-1,6-diisocyanate (26% NCO/4970 cp. at 25° C.) are intimately mixed with about 50 parts of 2,4-diamino-3,5-diethyltoluene, about 1 part of silicone stabilizer (Sf 1109 of General Electric) and about 20 parts of monofluorodichloromethane. A hard polyurea foam which has the following physical properties is obtained.

Bulk density: 42 kg./m.$^3$
Compression strength: 2.6 kg. wt./cm.$^2$
Heat bending resistance: 187° C.
The foam resin is dimensionally stable at −30° C. and +100° C.

Example 12

(a) About 85.5 parts of 4-chlorophenylene-1,3-diamine are reacted as described in Example 1(a) with about 1000 parts of a mixture of 80% of 2,4- and 20% of 2,6-tolylene diisocyanate. A polyisocyanate which has an NCO content of 39.1% and a viscosity of 62 cp. (at 25° C.) is obtained.

(b) About 80.0 parts of a polypropylene glycol which was started on trimethylolpropane and modified with ethylene oxide to result in approximately 60% of primary hydroxyl end groups of PH number 35.0, about 20.0 parts of a polypropylene glycol which was started on propylene glycol and modified with ethylene oxide to result in approximately 65% of primary hydroxyl groups at an OH number of 28, about 2.5 parts of dimethyl aminobenzylamine, and about 1.0 parts of diethylene glycol are mixed together and reacted with about 40.0 parts of the polyisocyanate described under Example 12(a).

A foam which has the following mechanical properties is obtained.

Bulk density according to DIN 53,420: 45 kg./m.³
Tensile strength according to DIN 53,571: 1.0 kg. wt./cm.²
Elongation at break according to DIN 53,571: 150%
Compression test at 40% compression according to DIN 53,577: 30 p./cm.²

Example 13

(a) About 73.3 parts of 1,5-dichlorophenylene-2,4-diamine are reacted as described in Example 1(a) with about 1000 parts of a mixture of 80% of 2,4- and 20% of 2,6-tolylene diisocyanate. A polyisocyanate having an NCO content of 39.75% and a viscosity of 55 cp. (at 25° C.) is obtained.

(b) About 100.0 parts of a polypropylene glycol which was started on trimethylolpropane and modified with ethylene oxide to result in approximately 63% of primary hydroxyl end groups of OH number 35.0, about 2.5 parts of water, about 0.3 parts of endoethylene piperazine, and about 0.2 parts of triethylamine are mixed together and reacted with about 37.7 parts of the polyisocyanate described under Example 13(a).

A foam which has the following mechanical properties is obtained.

Bulk density according to DIN 53,420: 45 kg./m.³
Tensile strength according to DIN 53,571: 0.6 kg. wt./cm.²
Elongation at break according to DIN 53,571: 120%
Compression test at 40% compression according to DIN 53,577: 35 p./cm.²

Although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the preparation of a polyisocyanate which contains biuret groups which comprises reacting in the absence of a solvent or organic diisocyanate and a diprimary aromatic diamine such that the $NH_2$:NCO ratio is 1:2 to 1:100, the diamine being added incrementally to the diisocyanate at a temperature of from about 100° C. to about 200° C., said diamine having at least one substituent which is selected from the group consisting of electrophilic substituents and substituents which sterically hinder the amino groups, said electrophilic substituents selected from the group consisting of —COOR, —COR, —CHO, —$NO_2$, —CN and —$SO_2R$ located in the ortho and/or para position relative to the amino groups, said substituents which sterically hinder the amino groups selected from the group consisting of $C_1$ to $C_6$ alkyl, $C_5$ to $C_7$ cycloalkyl, $C_6$ to $C_{10}$ aryl, F, Cl, Br, I and —OR located in the ortho position relative to the amino groups, wherein R in the above radicals represents $C_1$ to $C_6$ alkyl, $C_5$ to $C_8$ cycloalkyl or $C_6$ to $C_{10}$ aryl.

2. The process of Claim 1 wherein the reaction temperature is from about 130° C. to about 170° C.

3. The process of Claim 1 wherein the $NH_2$:NCO ratio is 1:4 to 1:40.

4. The process of Claim 1 wherein the diprimary aromatic diamine is selected from the group consisting of
3,5-diamino-4-chlorobenzoic acid propyl ester,
2,4-diamino chlorobenzene,
3,3'-dichloro-4,4'-diamino-diphenylmethane,
ethylene glycol-4,4'-diamino-bis-phenylether,
4-amino-3-chlorophenyl ester of 4-chloro-3-aminobenzoic acid,
4,4'-diamino-3,3'-dichlorodiphenylsuccinate,
1,5-dichloro-2,4-diamino-benzene,
2,4-diamino-3,5-diethyltoluene,
4-chlorophenylene-1,3-diamine, and
1,5-dichlorophenylene-2,4-diamine.

5. The process of Claim 1 wherein the polyisocyanate is selected from the group consisting of tolylene diisocyanate, diphenylmethane diisocyanate, hexamethylene diisocyanate and mixtures thereof.

References Cited
UNITED STATES PATENTS 3,201,372    8/1965    Wagner _____ 260—453 AB
3,392,183    7/1968    Windemuth et al. __ 260—453 AB JOSEPH P. BRUST, Primary Examiner U.S. Cl. X.R.

260—2.5 AT, 22 TN, 75 NT, 77.5 AT, 465 D, 471 R